United States Patent [19]

Laux

[11] Patent Number: 4,589,271

[45] Date of Patent: May 20, 1986

[54] TWO-ARMED HAND-LEVER PRESS

[76] Inventor: Friedrich-Günther Laux, Quitzowstrasse 24-26, D-1000 Berlin 21, Fed. Rep. of Germany

[21] Appl. No.: 585,840

[22] Filed: Mar. 2, 1984

[51] Int. Cl.[4] ........................ B21D 39/00; B23P 11/00

[52] U.S. Cl. ........................................ 72/449; 72/410; 29/751; 81/57.39

[58] Field of Search ................. 72/410, 409, 407, 449, 72/452; 29/751; 81/361, 57.39

[56] References Cited

U.S. PATENT DOCUMENTS

| | | | |
|---|---|---|---|
| 2,861,489 | 11/1958 | Barnes | 72/409 |
| 3,101,017 | 8/1963 | Malkin et al. | 72/409 |
| 3,324,702 | 6/1967 | Malkin | 72/409 |
| 3,342,059 | 9/1967 | Laux | 72/410 |
| 3,475,946 | 11/1969 | Laux | 72/409 |
| 3,903,725 | 9/1975 | Rommel | 72/410 |
| 4,199,973 | 4/1980 | Laux | 72/410 |

FOREIGN PATENT DOCUMENTS

| | | | |
|---|---|---|---|
| 753670 | 6/1966 | Canada | 72/410 |
| 1115952 | 5/1956 | France | 29/751 |
| 905923 | 2/1982 | U.S.S.R. | 29/751 |

*Primary Examiner*—Daniel C. Crane

*Attorney, Agent, or Firm*—Paul L. Sjoquist

[57] ABSTRACT

A two-armed hand-lever press, particularly for the solderless connecting of electric cables by means of a piece to be pressed, where pressing tool movable in longitudinal direction of the press can be actuated via at least one eccentric by a pawl from a lever arm, has at a part connecting the pressing tool a forward motion stop acting upon the advance movement of the pressing tool.

9 Claims, 6 Drawing Figures

FIG. 1
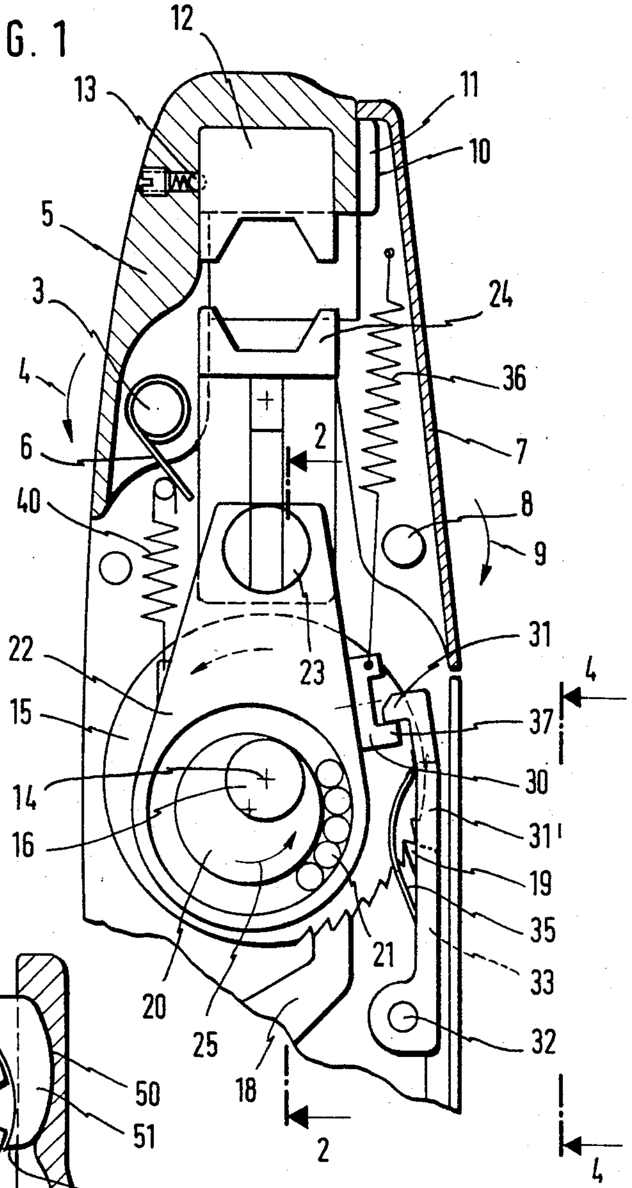
FIG. 2
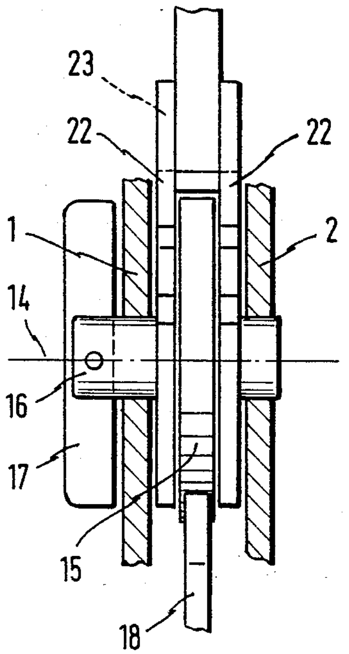
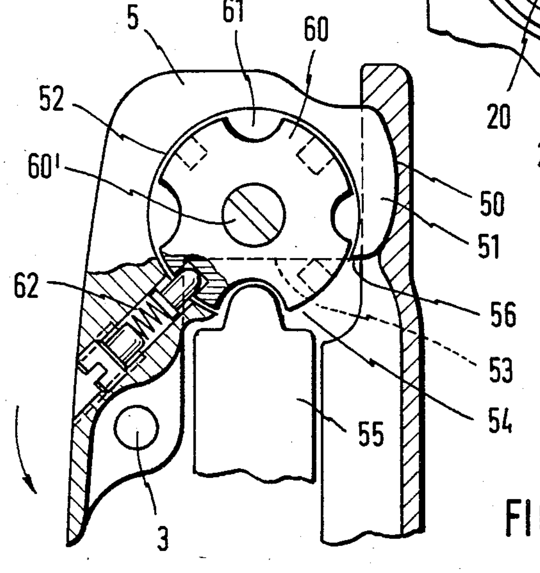
FIG. 3

TWO-ARMED HAND-LEVER PRESS

FIELD OF THE INVENTION

This invention relates to a two-armed hand-lever press, particularly for the solderless connection of electric cables, lines or the like by means of a cable bracket, a cable sleeve or the like inserted into the point of connection to be deformed by pressing, where a pressing tool, which is movable in longitudinal direction of the press, can be actuated, via at least one eccentric, by a pawl from a lever arm by means of said two handles.

BACKGROUND OF THE INVENTION

U.S. Pat. No. 4,199,973, issued Apr. 29, 1980 to the present inventor, illustrates such a lever press. The pawl which cooperates with the movable lever arm and if necessary is eccentrically mounted on two needle bearings engages a ratchet wheel advancing in turn, e.g. via a connecting rod, the pressing tool. In order to prevent the ratchet wheel from turning backwards after the lever arm has been swivelled, there is provided a return stop which is in the form of a pawl. After the pressing operation has been terminated, on releasing of the return stop the connecting rod is returned to the initial position by hand. After insertion e.g. of a cable bracket between the two die halves or by means of a matrix, there is necessarily produced a clearance between the tip of the pressing tool or also of the lower die half and the cable bracket, which results in that the hand lever has to be actuated at least once to cause the pressing tool to come close to the cable bracket.

OBJECTS OF THE INVENTION

One object of the invention is mainly based on the problem to provide a possibility to eliminate the above mentioned operation clearance and to facilitate considerably handling of the press; an other object is to maintain the location to be pressed centrally between the die parts or the like.

SUMMARY OF THE INVENTION

The objects to be solved are to provide at a part moving the pressing tool a forward motion stopping device which acts upon the advancing of the pressing tool.

The above mentioned return movement of the bottom part of the die or of the pressing tool to the initial position is usually caused from the outside by means of a turnable hand lever. In order to cause the inventive forward motion stop to come into engagement with the workpiece, e.g. the cable bracket, this turning is performed far enough to bring about snapping-in of the forward motion stopping device. After the cable bracket has been inserted between the die parts, the forward motion stop is released, whereby the lower die part is caused to move towards the upper one until engagement with the cable bracket takes place. Thereafter, the press is actuated in the usual manner by swinging the lever arm several times.

If, as has been stated in the foregoing, the lever press is designed such that the pressing tool can be moved by means of a connecting rod or the like, the forward motion stopping device can partly be arranged at the connecting rod. If the connecting rod is associated to a ratchet wheel which is provided with a return motion stop having a pawl, the forward motion stopping device, which has also a pawl, is preferably associated to the return stop. The forward motion stopping pawl can be in the form of a nose provided at a linkage which is swingable about a shaft the latter has in common with the return stop preferable against the force of the spring.

Furthermore it is in intended to provide a hand-lever press which particularly when the above indicated forward motion stopping device is used, is designed to be especially small and handy.

This is achieved for a hand-lever press having two handles attached to a housing receiving the movable parts of the press, of which handles one is constructed as a movable lever arm, by inventively giving the two handles the length of about 10 to 15 cm and attaching them directly to the housing.

It has turned out that an embodiment where the handles project angularly from the housing and together with it have the shape of a pistol is particularly useful.

In case of this embodiment, therefore, the two handles have to be taken in one hand so that the hand-lever press can only be actuated by closing the hand. This kind of operation applies self-evidently also in case the handles extending in longitudinal direction of the press.

In order to increase the handiness of the handles, the fixed handle can be designed to have an U-shape and so as to receive partially the movable handle, whereby an adaptation to the possible reaching of a hand is performed.

The invention has furthermore been based on the problem particularly by a compact or especially small design of the hand-lever press to provide a possibility of working under spatially much narrowed conditions (e.g. switch cabinet); it is also to be made possible to work rationally on different cross-sections.

If the hand-lever press is provided with an upper part of the die which is located opposite to the pressing tool and can be inserted in a yoke of the press, said upper part of the die according to the invention is in the form of a pressing star, which has as such is known and which in the pressing plane has a round and smooth outer surface being in contact with a corresponding smooth inner surface of the yoke.

The contact of the surface can extend over an arched angle of more than 180°, preferably more than 270°.

The pressing star can preferable be inserted from one side into the yoke, whereas from the other side it is rotatably held by means of a screw or the like. This screw, however, contrary to the known embodiment, need not receive any pressing forces.

In order also to simplify the design of the yoke and to facilitate arresting of the pressing star, it is possible to arrest the latter, in a manner known per se, only when a spring-mounted stopping pin is used.

The drawing shows exemplifying embodiments of the invention which hereinafter will be described in more detail: it is shown in FIG. 1 a partial section through an embodiment of the invention, FIG. 2 a section along the line 2—2 in FIG. 1

FIG. 3 a detail of a modified embodiment of the invention,

FIG. 4 a section along the line 4—4 in FIG. 1,

FIG. 5 a side view on part of an embodiment, and

FIG. 6 a section along the line 6—6 in FIG. 5.

DESCRIPTION OF THE PREFERRED EMBODIMENTS

Figure 4:
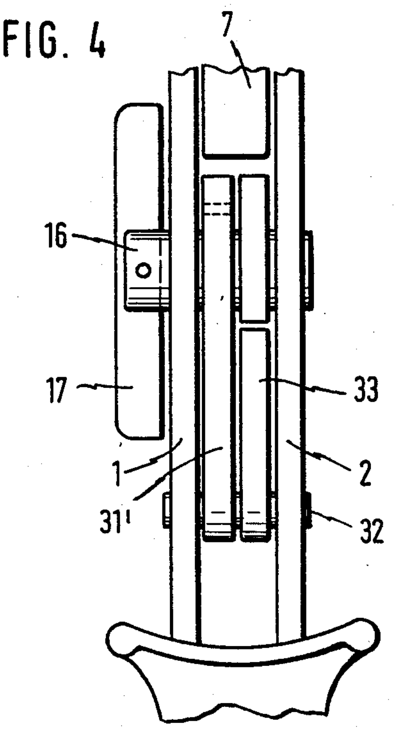
Figure 5:
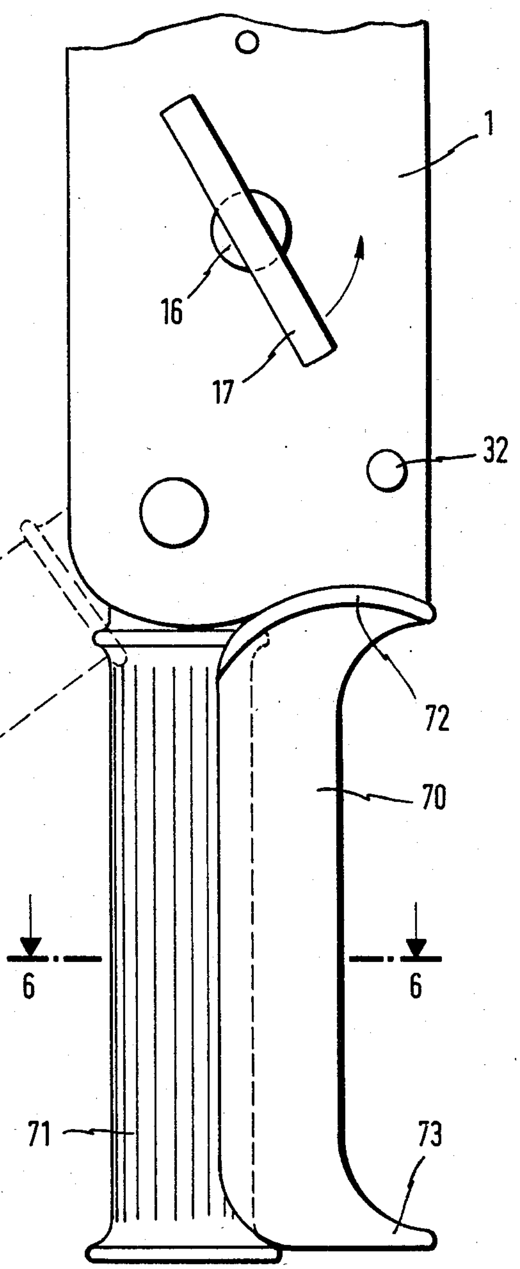

A hand-lever press including in longitudinal direction a housing having a length of 18 cm and handles having a length of 11 cm has two side walls 1 and 2 which extend parallel one to another and between which the movable parts of the press are mounted. At the upper margin of the side parts 1 and 2, there is provided a hinge 3 about which a yoke can be swung in the direction of the arrow 4. A spring 6 is provided for facilitating the return movement of the yoke 5.

The yoke 5 is kept in the shown effective position by a closure tongue 7 which is swingable about a hinge 8 in the direction of the arrow 9, there being provided in the closure tongue a recess 10 into which engages a correspondingly formed strip-shaped projection 11 of the yoke 5 when it is in its effective position.

There can be inserted in the yoke an upper die part 12 which is maintained in effective position by a spring catch 13.

Between the two side parts 2, there is rotatably mounted about an axis 14 a ratchet wheel 15 which is wedged up on a pin 16 which in turn carries a handle 17.

The ratchet wheel 15, which at least in its region facing away from the yoke is provided with teeth, can be caused to engage, on the one hand, a tension pawl 18, and, on the other hand, a return ratchet 19.

On the pin 16, there is rotatably mounted an eccentric 20 which is connected to the ratchet wheel 15 or the stepping wheel and which via a roller bearing or a needle bearing 21 carries a connecting rod 22 at which, via a hinge 23, a guide piece can be moved up and down. On actuation of the hereinafter described hand lever, the pawl 18 causes the ratchet wheel to move in the direction of the arrow 25 so that the connecting rod 22, which consists of two parallel mirror-symmetrical parts, is moved in the direction towards the upper die part 12; the connecting rod can also consist of a single part which via the ratchet wheel performs engagement by means of a bent portion.

For returning the connecting rod 22 to the position shown in FIG. 2—i.e. the initial position for introducing the piece to be pressed, e.g. a cable bracket—the handle 17 is turned, as hereinafter will be described in more detail.

At the actuating rod 33, there is fastened a U-shaped seat 30 for a nose 31 of a forward motion stopping pawl. This forward motion pawl has a rod 31' which can be swivelled about a shaft 32. It is the same shaft 32 about which the return stopping pawl 19, which is integrally formed with a rod 33, can be swivelled. The rods 31' and 33 are moved separately, i.e. such that on actuation of the hand lever, the return stopping pawl 19 is released from the ratchet wheel or stepping wheel 15; the rod 33 is simultaneously moved so that the nose 31 is drawn out of its U-shaped seat 30. The rod 31' is by a leaf spring 35 maintained in engagement direction, but it can without any damage also be overrun when the ratchet wheel is turned on. At the U-shaped seat 30, there is fastening a tension spring 36 whose free end is arrested in the holding tongue 7 and which acts to the effect that the lower die part engages the inserted piece to be pressed.

The manner of operation of the forward motion stopping device is as follows:

When by means of the handle 17 the connecting rod 22 is turned backwards to the shown initial position, the connecting rod is moved in the direction to the lowermost dead center position, but slightly in excess thereof, as shown in FIG. 1, whereby the tension springs 36 and 40 are tensioned. The turning movement terminates at about 10° to 15° after exceeding of the dead center; now the center of the eccentric is located in the shown position; there has thus been produced a small and sufficient resultant lever path for the applied tensile forces, i.e. so that after releasing of the forward motion stopping pawl the stepping or ratchet wheel 15 can be caused to move in the desired direction of rotation. The possible frictional forces have as far as possible to be eliminated during this process.

The nose 31 engages resiliently over projection 37 of the U-shaped seat 30 and snaps-in in this position so that on the one hand the lower die part 24 engages the piece to be pressed, e.g. the cable bracket, and on the other hand further advance movement of the connecting rod 22 cannot be performed automatically any more although the tension springs 36 and 40 would effect this.

In FIG. 3, the yoke 5 is in engagement with a holding tongue 50, and this is performed via a projection 51 of the yoke which engages in a corresponding recess of the closure tongue 50.

The yoke has vertically to the pressing direction a circular recess 52 which however on the rear side is closed until the line 53. The circular opening in the yoke extends from the point 54 at the height of the pressing tool 55 until approximately the margin 56, i.e. over an arched angle of about 270°.

A pressing star 60, which has for example four different recesses 61 of differing sizes for receiving a corresponding cable bracket or the like, is in sliding engagement with the circular bore in the yoke 5. The pressing star 60 is held in the bore 52 by a screw 60' (in the shown position). This screw 60' extends into the opposite wall and serves only for preventing the pressing star from falling out; the bore 52 of the yoke 5 serves during pressing as an abutment for the pressing star, receiving the laterally acting forces produced during pressing.

A resiliently mounted stop pin 62 is movably positioned in the yoke 5; any further fixing device for the pressing star to be held in the respective effective position is not necessary.

Figure 6:
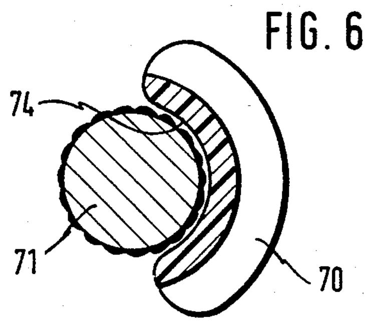

The handles 70 and 71, which have a length of about 10 cm, are directly attached to the housing defined by the side parts 1 and 2; the handle 70, as can be seen particularly from FIG. 6 has an approximately U-shaped cross-section and is outwardly bent at its upper edge 75 and lower edge 73. The U-shaped recess 74 makes it possible to receive the handle 71, which is in the form of a hand lever, in closed position partly in the handle 70. The swung-out position of the hand lever 71 is indicated by the dashed lines 75; swinging-out can be performed up to an arched angle of about 50° so that actuation of the lever press is possible by one hand, whereas the other hand can hold, for example, the workpiece or the cable.

Despite the compact design, i.e. the above mentioned length of about 29 cm and a width of about 6 cm, and an actuation by one hand, there can be achieved a pressing force of about 2.5 tons by swinging the handle 71 several times.

I claim:

1. In a two-armed hand-lever press, particularly for the solderless connecting of electric cables, lines or the like by means of a cable bracket, a cable sleeve or the like inserted into the point of connection to be deformed by pressing, where a pressing tool housing contains a fixed press die and a movable press die which is movable relative to the fixed press die and actuable by at least one eccentric and by a pawl from a lever arm coupled to one of said two-armed hand-levers, the improvement comprising resilient spring means for urging the movable press die toward the fixed press die and a pivotable stop means for selectively restraining said movable press die at a position away from said fixed press die against the force of the resilient spring means.

2. In a hand-lever press according to claim 1, further comprising a connecting rod or the like coupled between said movable press die and said eccentric and wherein said pivotable stop means is engageable against the connecting rod.

3. In a hand-lever press according to claim 2, further comprising a ratchet wheel which is provided with a return stop having a pawl connected to said eccentric, and wherein said pivotable stop means further comprises a return stop on said connecting rod and a pawl pivotally mounted to one of said handles.

4. In a two-armed hand-lever press, particularly for the solderless connecting of electric cables, lines or the like by means of a cable bracket, a cable sleeve or the like inserted into the point of connection to be deformed by pressing, having a tool housing containing a fixed press die and a movable pressure die which is forwardly slidable toward said fixed press die, and where said movable pressure die is actuable via at least one eccentric by a pawl from a lever arm by means of said two-armed hand-levers, the improvement comprising a spring urging said movable pressure die toward said fixed press die, and a forward motion stopping device attached to one of said two-armed hand-levers and engageable against said pressure die to restrain said pressure die from forward movement, and a housing receiving the movable pressure die, one of said two-armed hand-levers being fixed to said housing and the other of said two-armed hand-levers being movably attached to said housing and said two-armed hand-levers projecting angularly from said housing.

5. In a hand-lever press according to claim 4 wherein said fixed handle is U-shaped in cross-section and is constructed to receive partially the movable handle.

6. The apparatus of claim 4, wherein said pressure further comprises a yoke adapted to receive an upper die part, and an upper die part insertable into said yoke, said upper die part being in the form of pressing star which in the pressing plane has a circular smooth outer surface contacting a corresponding smooth inner surface of said yoke.

7. In a hand-lever press according to claim 6, wherein said surface contacts extending over an arched angle of more than 180°.

8. In a hand-lever press according to claim 7, wherein said pressing start is insertable into said yoke from one side and from the other side is rotatably held by a screw or the like.

9. In a two-armed hand-lever press, particularly for the solderless connecting of electric cables, lines or the like by means of a cable bracket, a cable sleeve or the like inserted into the point of connection to be deformed by pressing, having a tool housing containing a fixed die and a slidable die, and a spring connected between said slidable die and said housing to urge said slidable die toward said fixed die, and having an eccentric cam actuable by a ratchet wheel and pawl mechanism from one of said two-armed hand-levers, the improvement comprising means for reversibly sliding said slidable die away from said fixed die; a seat connected to said slidable die; and a pawl pivotably attached to said housing and engageable into said seat at a predetermined position of said slidable die, said pawl restraining said slidable die against the urging of said spring.

* * * * *